March 26, 1935.  C. KANNEL  1,995,456
VENTILATOR CONSTRUCTION
Filed Aug. 23, 1932   2 Sheets-Sheet 1
Fig.1.
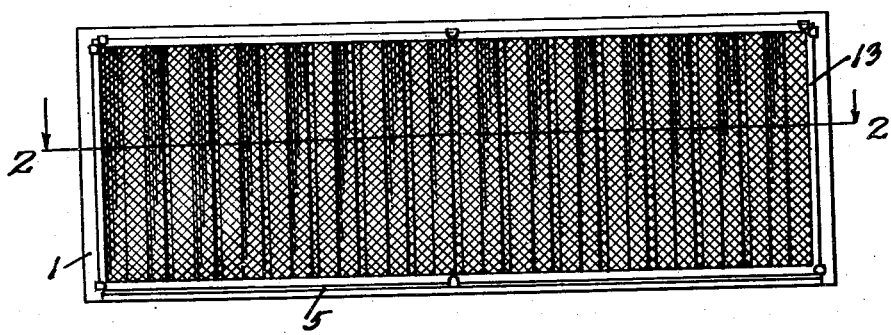
Fig.2.
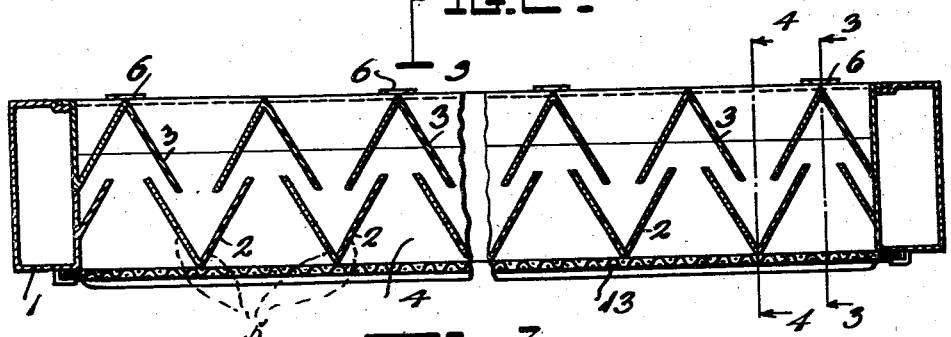
Fig.3.
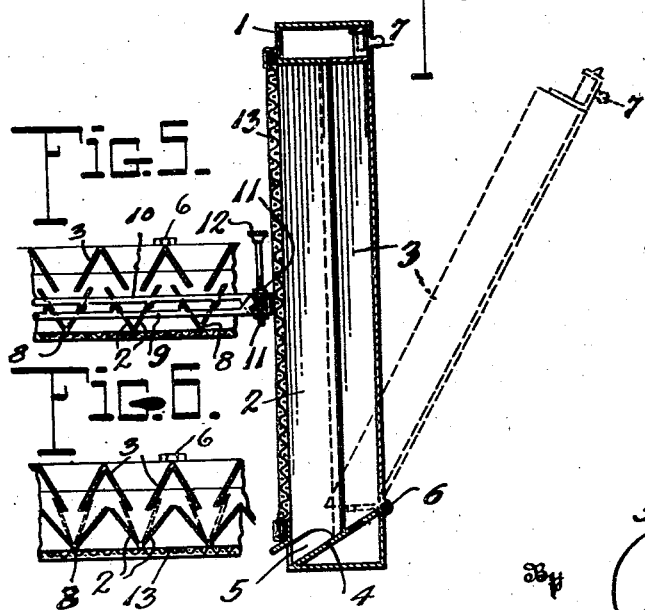
Fig.4.
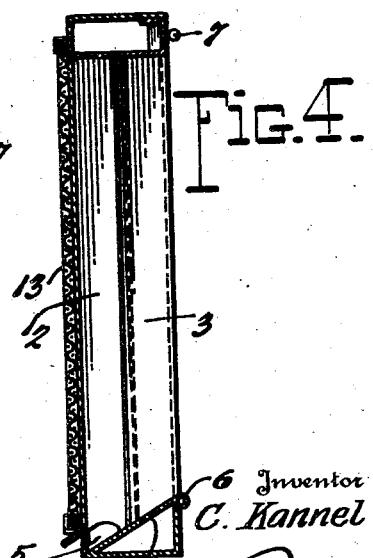
Fig.5.
Fig.6.
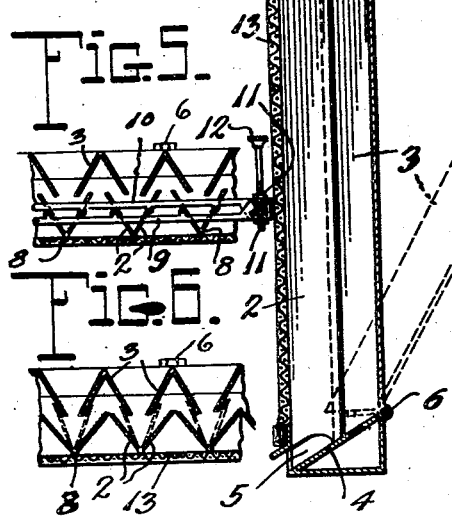
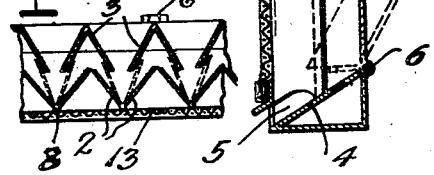
Inventor
C. Kannel
By Robb & Robb
Attorneys

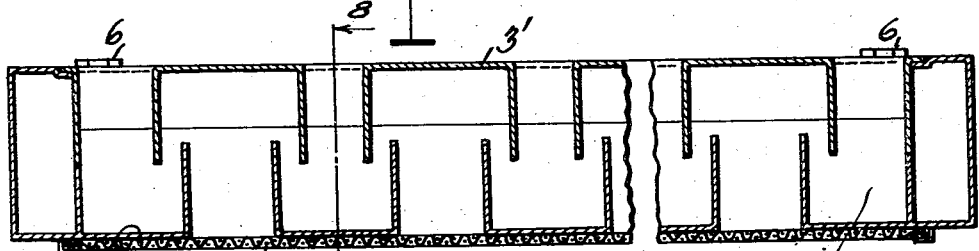
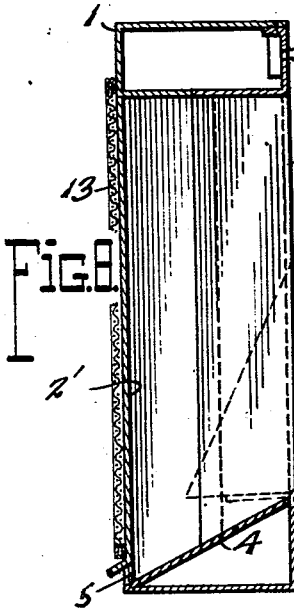
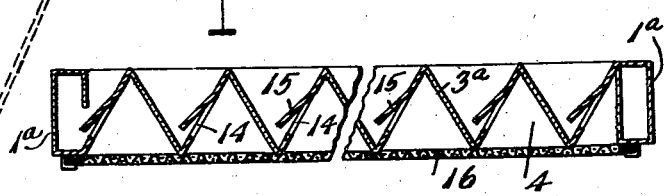
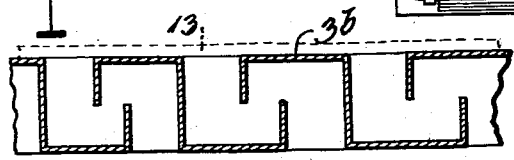

Patented Mar. 26, 1935

1,995,456

UNITED STATES PATENT OFFICE 1,995,456

VENTILATOR CONSTRUCTION

Charles Kannel, Luray, Va.

Application August 23, 1932, Serial No. 630,150

10 Claims. (Cl. 98—88)

The present invention relates to improvements in ventilators of that type which may be used in various places, such as in windows and in doors, where it is desired to admit air while at the same time preventing dust, rain, and insects from passing through. Being made in the form of a unit, the invention is capable of being used in dwellings, office buildings, traveling vehicles, and elsewhere, but for the purposes of this disclosure it is herein illustrated in that form of the device which is suitable for introduction into a window.

One of the main objects of my invention is to provide a ventilator construction in which opposing shutters are so arranged that the air will have to take a tortuous path in passing through the frame, the frame and arrangement of the shutters causing the air to impact against pocketing surfaces, whereby dust or rain will be caught, thrown downwardly, and back outwardly while the air passes on into the room.

A further object in view is to provide an adjustable arrangement of shutters which will permit the air passages to be controlled more or less as to their area.

It is further an object of my invention to provide a shutter arrangement comprising opposing sets, at least one of such sets being capable of displacement from operative position to enable freer passage of air through the ventilator.

Other and further objects and advantages of the invention will be hereinafter set forth and the novel features thereof defined by the appended claims.

In the drawings:

Fig. 1 is a front elevation of a ventilator unit constructed in accordance with my invention;

Fig. 2 is a horizontal sectional view on the line 2—2 of Fig. 1;

Figs. 3 and 4 are transverse sectional views on the line 3—3 and 4—4, respectively, of Fig. 2;

Figs. 5 and 6 are fragmentary sectional views showing a modified form embodying adjustable shutter elements or vanes;

Fig. 7 is a horizontal sectional view of another form of my invention;

Fig. 8 is a vertical section of that form shown in Fig. 7;

Fig. 9 is a horizontal sectional view of a still further modification;

Fig. 10 is a front elevation of that form of construction shown in Fig. 9;

Fig. 11 is a further modified form;

Fig. 12 is an enlarged fragmentary view similarly in Fig. 5 and disclosing the shutter adjusting mechanism.

Like reference characters designate corresponding parts in the several figures of the drawings.

In specifically describing my invention 1 designates a rectangular frame made of metal, wood, or other material, in the opposite sides of the opening of which are position opposing sets of shutters, one set being designated 2 and the shutters of the other set designated 3. It will be noted that these shutters are V-shape in cross section in this form of the device and those of one set being disposed in staggered relation with reference to those of the companion set. That is to say, the apices of the shutters of the set designated 3 are disposed opposite the space between the adjacent sides of pairs of shutters in the set 2. This arrangement is quite important because the air current which passes between the shutters 2 hits into the pockets formed by the diametrically opposed shutters 3 which provide impact surfaces against which the dust, rain and insects must impinge. The result of this arrangement is that particles of dust and rain drop downwardly while the air is forced to take a reverse direction of movement, again impacting into the pockets formed by the converging shutters 2 of the other set. This causes further impacting of the remaining dust and rain and the final direction of the air between the spaces of the opposed shutters 3 and into the room. Such a tortuous path for the air current insures clean air entering into the room with a much decreased velocity.

As shown in Figs. 3 and 4, the base of the frame 1 is formed with an inclined deflector plate 4 which deflects the dust and water outwardly through the base opening 5. I desire it to be understood here, that while I have illustrated in the drawings a vertical arrangement of the shutter members, I do not wish to be limited in any way to this form, as it will be apparent that a horizontal disposition of these members will be equally effective and within the purview of my invention.

In that form of the unit shown in Figs. 1 and 4 I prefer to movably mount the set of shutters 3, as by hinging the same at 6. A latch 7 will hold the shutter plate in closed or operative position and when it is desired to allow a freer passage of air through the ventilator, as upon a still and warm day, the latch 7 is unlocked and the shutters 3 dropped downwardly, as shown in Fig. 3 to inoperative position.

Another method of controlling the air passing through the ventilator is shown in Figs. 5, 6 and 12. In this form the side pieces of each of the shutters 2 are hingedly mounted at the apex 8, the corresponding side pieces of each being connected to a bar 9 having a slotted extremity, while the opposing side pieces of each is connected to a similar bar 10. The slotted extremities of these bars 9 and 10 are superimposed with respect to each other and have the slots 9' and 10' disposed in oppositely inclined positions. A threaded operating screw 12ª is journaled in the frame below the extremities or plates of the bars 9 and 10 and has an operating or finger-piece 12. The screw has threaded thereon the pin block or nut 11ª having the operating or camming pin 11 which passes through the slots 9' and 10' in the bar extremities.

When the thumb knob or finger-piece 12 is rotated the screw 12ª is turned causing the block to be shifted along the threaded stem. Impingement of the pin 11 against the sides of the inclined slots 9' and 10' will cause the bars 9 and 10 to be shifted in opposite directions.

Since the bar 9 is connected to all of the left hand sections or side members of the shutters 2 while the other bar 10 is connected to the right hand shutter sections this movement will shift the shutter members in opposite directions to regulate or close the ventilator opening.

Before passing to further modifications of my invention, it is preferred to attach to the outer face of the frame 1 a screen member 13. This acts as a baffle and tends to prevent insects from entering through the ventilator.

Fig. 7 is a modified form of the device in which the shutter members of the respective sets 2' and 3' are U-shaped in cross section each being staggered in relation to the other and coacting similarly to the V-shaped shutter of the form previously described.

Fig. 9 discloses a further modified form in which the shutters are made from a single sheet of material bent into substantially Z form to provide V-shaped shutters 3ª terminating in rectangular side pieces of the frame 1ª. The material of one leg or side of each of these V-shapes is stamped outwardly to provide an opening 14, the material stamped out forming angularly disposed deflectors 15. This is a simplified form of construction and it also preferably includes a screen member 16. The air in passing through the ventilator necessarily strikes into the V-pockets and in passing through the openings 14 is deflected by the shutter elements 15 against the back faces of the shutters. This produces the same double deflection and impact as described in connection with the first form.

In Fig. 11 is similarly shown another way of bending the shutters 3ᵇ, in cross section said shutters being substantially S form, whereby similar results are obtained as described with reference to the forms hereinbefore mentioned.

It will be understood that other slight changes may be made in the details of construction of the ventilator unit without departing from the spirit of the invention and within the scope of the claims hereto appended.

Having thus described my invention what I claim as new and desire to secure by Letters Patent is:

1. A ventilator unit of the class described comprising a frame, opposing sets of shutter members formed of angularly bent material disposed in said frame, the shutter members of one set overlapping the shutter members of the other set so as to present a tortuous passageway having opposing pockets, one set of shutters being hingedly mounted in the frame as a unit and movable to and from cooperative relation with respect to the companion set of shutters.

2. A ventilating unit of the class described comprising a frame, a set of stationary trough-shaped shutter members mounted in spaced relation at one side of the frame, a second set of similarly formed shutter members hingedly arranged as a unit at the other side facing and overlapping those of the other set to form tortuous passages, and a screen member attached to the face of the stationary frame over the shutters.

3. A ventilating unit of the class described comprising a frame, a set of stationary trough-shaped shutter members mounted in spaced relation at one side of the frame, a second set of similarly formed shutter members arranged at the other side facing and overlapping those of the other set to form tortuous passages, the shutter members of one set being composed of pairs of hingedly adjustable side members, and means for simultaneously adjusting said side members toward and away from corresponding sides of the shutter members of the opposing set.

4. A ventilator unit of the class described comprising a frame, a set of angularly arranged shutters disposed at one side of said frame, a second set of angularly formed shutters disposed at the opposite side and facing the angular shutters of the first mentioned set, said second-mentioned set being hingedly mounted as a unit for movement to and from operative position with relation to the first-mentioned set.

5. A ventilating unit of the class described comprising a frame having an outwardly and downwardly inclined bottom portion, a set of trough-shaped vertically disposed shutter members arranged in the frame in spaced relation to each other, each shutter member having spaced edges and being formed with a dust discharge opening intermediate its edges and adjacent the inclined portion of the frame.

6. In a ventilating unit of the class described a substantially rectangular frame having an inclined bottom portion, a set of spaced trough-shaped vertical shutter members arranged within the frame at one side thereof, each of said shutter members being cut away adjacent the inclined bottom to provide a dust discharge opening therein, and a second set of trough-shaped shutter members disposed in the opposite side of the frame and hinged to the bottom portion of the frame to swing out of the frame and away from the first set of shutter members, the trough portions of said sets being disposed in opposing overlapping relation when positioned within the frame to provide a tortuous air passage.

7. In a ventilating unit of the class described a substantially rectangular frame having an inclined bottom portion, a set of spaced trough-shaped vertical shutter members arranged within the frame at one side thereof, each of said shutter members being cut away adjacent the inclined bottom to provide a dust discharge opening therein, a second set of trough-shaped shutter members disposed in the opposite side of the frame and hinged to the bottom portion of the frame to swing out of the frame and away from the first set of shutter members, the trough portions of said sets being disposed in opposing overlapping relation when positioned within the frame to provide a tortuous air passage, and a screen disposed across the frame adjacent the first mentioned shutter members.

8. In a ventilating unit of the class described a substantially rectangular frame having an inclined bottom portion, a set of spaced trough-shaped vertical shutter members arranged within the frame at one side thereof, each of said shutter members being cut away adjacent the inclined bottom to provide a dust discharge opening therein, a second set of trough-shaped shutter members disposed in the opposite side of the frame and hinged to the bottom portion of the frame to swing out of the frame and away from the first set of shutter members, the trough portions of said sets being disposed in opposing overlapping relation when positioned within the frame to provide a tortuous air passage, a screen disposed across the frame adjacent the first mentioned shutter members, and latch means for retaining the second set of shutter members within the frame.

9. In a ventilating device of the class described comprising a frame, opposing sets of trough shaped shutter members disposed in overlapping relation at opposite sides of the frame, the shutter members of one set being fixed within each of the trough shaped frames, the shutter members of the other set being hinged to the frame intermediate their free edges, and means for simultaneously adjusting the edges of said shutter members toward and away from the free edges of the first mentioned shutter members.

10. In a ventilating device of the class described comprising a frame, opposing sets of trough-shaped shutter members disposed in overlapping relation at opposite sides of the frame having longitudinal edges disposed in spaced relation, the shutter members of one set being fixed within the frame, the shutter members of the other set comprising side members hinged to the frame intermediate their longitudinal edges, means for simultaneously adjusting said shutter members toward and away from the longitudinal edges of the first mentioned shutter members, said means comprising a pair of shutter operating bars, connecting the opposite sides of the pivoted shutter members, and means for simultaneously moving the bars in opposite directions.

CHARLES KANNEL.